United States Patent
Rizzo et al.

(10) Patent No.: US 8,022,889 B2
(45) Date of Patent: Sep. 20, 2011

(54) ANTENNA IMPEDANCE MODULATION METHOD

(75) Inventors: Pierre Rizzo, Aix en Provence (FR);
Christophe Moreaux, Simiane (FR);
David Naura, Aix en Provence (FR);
Ahmed Kari, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 563 days.

(21) Appl. No.: 12/038,513

(22) Filed: Feb. 27, 2008

(65) Prior Publication Data

US 2008/0212346 A1    Sep. 4, 2008

Related U.S. Application Data

(63) Continuation-in-part of application No. PCT/FR2006/001766, filed on Jul. 19, 2006.

(30) Foreign Application Priority Data

Sep. 2, 2005    (FR) ................................. 05 08982

(51) Int. Cl.
*H01Q 13/00*    (2006.01)

(52) U.S. Cl. ........ 343/876; 343/793; 363/60; 455/127.5
(58) Field of Classification Search .................. 343/876, 343/793; 363/60, 61; 455/127.5
See application file for complete search history.

(56) References Cited

U.S. PATENT DOCUMENTS

| | | | |
|---|---|---|---|
| 6,841,981 B2 * | 1/2005 | Smith et al. | 323/312 |
| 7,561,866 B2 * | 7/2009 | Oliver et al. | 455/343.3 |
| 2005/0162145 A1 | 7/2005 | Smith et al. | |

FOREIGN PATENT DOCUMENTS

FR    2750227 A1    12/1997

* cited by examiner

*Primary Examiner* — Tho G Phan
(74) *Attorney, Agent, or Firm* — Lisa K. Jorgenson; E. Russell Tarleton; Seed IP Law Group PLLC

(57) ABSTRACT

A method for modulating the impedance of an antenna circuit supplying pump signals to a charge pump comprising at least one first pump stage and one last pump stage, the last pump stage supplying a continuous voltage. The output of the first pump stage is short-circuited by means of a switch and the last pump stage goes on pumping electric charges and supplying the continuous voltage. Application in particular to RFID passive transponders.

17 Claims, 3 Drawing Sheets

ANTENNA IMPEDANCE MODULATION METHOD

BACKGROUND

1. Technical Field

The present disclosure relates to an antenna impedance modulation method, with application to contactless integrated circuits and, more particularly, to contactless integrated circuits of the passive type electrically powered by signals supplied by an antenna circuit.

2. Description of the Related Art

Contactless integrated circuits or RFID integrated circuits (Radio Frequency Identification) are used in various applications like the manufacture of electronic tags and contactless chip cards, for example electronic wallets, access control cards, transport cards, etc.

The disclosure more particularly relates to UHF contactless integrated circuits, provided to operate in the presence of an UHF electric field oscillating at a frequency of several hundreds MHz, generally ranging from 800 MHz to 100 GHz.

FIG. 1 schematically shows a contactless integrated circuit IC1 of the UHF type. The circuit IC1 includes an antenna circuit ACT, a primary charge pump PMP, a modulation circuit MCT and a demodulation circuit DCT, together forming a contactless communication interface. The integrated circuit also comprises a control unit CTU and a non-volatile memory MEM. The memory is for example an EEPROM memory (electrically erasable and programmable), allowing the integrated circuit to memorise transaction and identification data. The control unit CTU controls the access to the memory by executing commands for reading or writing in the memory.

The antenna circuit ACT includes two conductors W1, W2 forming a dipole. In the presence of an electric field E emitted by a reader RD1 schematically shown in the figure, antenna signals S1, S2 appear on the conductors W1, W2. These antenna signals S1, S2 are alternating signals of low amplitude, a few tenths of Volts only, and are in phase opposition.

The primary charge pump PMP is driven by the signals S1, S2, used as pump signals, and supplies a continuous voltage Vcc. The voltage Vcc is typically about one Volt to a few Volts, for example 1.8 V, and ensures the power supply of the integrated circuit if it is completely passive (that is without autonomous power supply, like a battery).

The circuit MCT receives from the control unit CTU data DTx to be sent via the antenna circuit, and modulates the impedance of the antenna circuit ACT according to these data. To that end, the circuit MCT applies to the charge pump PMP a modulation signal Sm(DTx) which contains the data DTx in coded form. The signal Sm(DTx) has a non-active value by default, for example 0 and, during the modulation periods, has an active value, for example 1, which has the effect of short-circuiting the charge pump.

When the signal Sm(DTx) is inactive, the antenna circuit ACT absorbs all the incident power Pi emitted by the reader RD1 and picked up by the antenna circuit ACT which impedance is adapted to that purpose. When the signal Sm(DTx) is 1, the short-circuit of the charge pump causes a modulation of the antenna circuit impedance and consequently a modulation of its reflection coefficient. The antenna circuit is then detuned and sends a reflected wave of power Pr. The reflected wave is received by the reader RD1 on its own antenna circuit, which outputs a modulated signal that is the image of the signal Sm(DTx). The reader extracts the modulated signal from its antenna circuit, by means of adapted filters, and deduces the data DTx, after demodulation and decoding. This technique of passive data transmission is generally called "backscattering".

FIG. 2 shows the standard structure of the charge pump PMP and also shows a modulation switch SW1 controlled by the signal Sm(DTx) and arranged for short-circuiting the charge pump.

The charge pump PMP comprises three pump stages in series. Each stage comprises two diodes and two capacitors, the latter being connected to the conductors W1, W2 of the antenna circuit to receive the signals S1, S2. The modulation switch SW1 is arranged in parallel with the output of the last stage of the charge pump. The switch is ON (conducting) when Sm(DTx)=1 and is OFF (not conducting) when Sm(DTx)=0.

When the switch SW1 is ON, the output of the charge pump is short-circuited and the voltage Vcc is no longer produced. In order to avoid a total break of voltage Vcc supply, a hold capacitor Ch is added at the output of the charge pump. The capacitor Ch is linked to the output of the charge pump through an inverse-mounted isolation diode Di. Thus, when the switch SW1 short-circuits the output of the charge pump, the diode Di blocks itself and the capacitor Ch alone holds the voltage Vcc above a critical threshold under which the integrated circuit stops operating.

An auxiliary switch SW2, driven by a signal /Sm(DTx) supplied by an inverting gate IG1, is arranged in parallel with the diode Di. When the switch SW1 is OFF, the switch SW2 is ON and the diode Di is short-circuited. Thus, the capacitor Ch is charged at the voltage Vcc without loss of voltage at the terminals of the diode Di.

This method for modulating the impedance of the antenna circuit ACT, although essential for sending data by backscattering, has the drawback of completely neutralizing the production of continuous voltage Vcc by the charge pump. Thus, despite the provision of the hold capacitor Ch, the voltage Vcc rapidly decreases when the integrated circuit sends data. The periods of data emission are thus critical periods as far as energy reception is concerned, and define the maximum communication distance with the reader RD1.

BRIEF SUMMARY

Thus, the disclosure aims at a method of allowing the impedance of a UHF antenna circuit to be modulated without completely inhibiting the production of continuous voltage by the primary charge pump.

In accordance with one embodiment, a method is provided for modulating the impedance of an antenna circuit supplying pump signals to a charge pump having at least a first pump stage and a last pump stage, the last pump stage supplying a continuous voltage, the method including a step of applying a short-circuit to the charge pump, wherein the short-circuit is applied to the output of the first pump stage, in order to allow the last pump stage to go on pumping electric charges and supplying the continuous voltage.

According to one embodiment, the charge pump includes at least one intermediary pump stage between the first and the last pump stages, and wherein the short-circuit of the charge pump is applied to the output of the first pump stage in order to allow the intermediary pump stage to go on pumping electric charges.

According to another embodiment, the short-circuit is applied to an output capacitor of the first pump stage.

According to a further embodiment, the method is applied to a charge pump wherein each pump stage includes an input diode and an input capacitor, an output diode and an output capacitor, the cathode of the input diode connected to the anode of the output diode and to a first terminal of the input capacitor, a second terminal of which receives a first antenna signal as a first pump signal, the cathode of the output diode connected to a first terminal of the output capacitor, a second terminal of which receives a second antenna signal as second pump signal.

According to still yet another embodiment, the short-circuit is applied by means of a modulation switch that has a low intrinsic serial resistance and does not include any additional serial impedance.

The disclosure also relates to a contactless integrated circuit including an antenna circuit, a charge pump driven by pump signals supplied by the antenna circuit, the charge pump including at least a first pump stage and a last pump stage, the last pump stage supplying a continuous voltage, and at least one switch for modulating the impedance of the antenna circuit, arranged for short-circuiting the charge pump when it is in the conducting state, wherein the modulation switch is arranged for short-circuiting the output of the first stage of the charge pump, in order to allow the last stage of the charge pump to go on pumping electric charges and supplying the continuous voltage.

According to one embodiment, the charge pump includes at least one intermediary pump stage between the first and the last pump stages, which goes on pumping electric charges when the modulation switch short-circuits the output of the first stage of the charge pump.

According to one embodiment, the modulation switch is arranged for short-circuiting an output capacitor of the first stage of the charge pump.

According to one embodiment, each pump stage includes an input diode and an input capacitor, an output diode and an output capacitor, the cathode of the input diode being connected to the anode of the output diode and to a first terminal of the input capacitor, a second terminal of which receives a first antenna signal as first pump signal, the cathode of the output diode being connected to a first terminal of the output capacitor, a second terminal of which receives a second antenna signal as second pump signal.

According to one embodiment, the integrated circuit is electrically powered by the continuous voltage supplied by the last stage of the charge pump.

According to one embodiment, the modulation switch has a low intrinsic serial resistance and does not include any additional serial impedance, to apply a total short-circuit to the output of the first stage of the charge pump.

The disclosure also relates to an electronic portable object including a portable support and an integrated circuit according to the disclosure, fixed onto, or integrated into the portable support.

In accordance with another embodiment of the present disclosure, a circuit for modulating the impedance of an antenna while maintaining a supply of voltage from signals received on the antenna is provided, the circuit including a charge pump coupled to the antenna, the charge pump comprising a plurality of charge pump stages adapted to supply power extracted from the received signals on the antenna, each charge pump stage having an input coupled to the antenna and an output coupled to a succeeding charge pump stage, with the output of the last charge pump stage coupled to a voltage supply output; and a switch element coupled between the antenna and the output of one of the charge pump stages that is not the last charge pump stage to couple and uncouple the output of the one of the charge pump stages that is not the last stage to the antenna in response to a control signal while the succeeding charge pump stage or stages continue supplying voltage on the voltage supply output.

In accordance with another aspect of the foregoing embodiment, the antenna is a dipole antenna and the switch element is coupled to a pole of the dipole antenna.

In accordance with another aspect of the foregoing embodiment, the circuit includes a control circuit adapted to generate the control signal as a binary signal to open and close the switch element in response to data stored in the circuit.

In accordance with another embodiment of the present disclosure, a method is provided for modulating the impedance of an antenna while maintaining a supply of power from signals received on the antenna through a charge pump coupled to the antenna, the charge pump having a plurality of charge pump stages adapted to supply power extracted from the received signals, each charge pump stage having an input coupled to the antenna and an output coupled to a succeeding charge pump stage, with the output of the last stage coupled to a voltage supply output, the method including the steps of: generating a control signal; and applying the control signal to a switch to periodically couple and uncouple at least one charge pump stage that is not a last charge pump stage of the charge pump to the antenna while allowing succeeding charge pump stages to continue supplying voltage to the voltage supply output.

In accordance with another aspect of the foregoing embodiment, the generation of the control signal includes generating a binary signal to open and close the switch in response to binary data read from a memory.

In accordance with another aspect of the foregoing embodiment, the coupling and uncoupling of the at least one charge pump stage to the antenna includes coupling and uncoupling the at least one charge pump stage to one pole of a dipole antenna.

In accordance with another embodiment of the present disclosure, a radio frequency identification device is provided that includes an antenna; a charge pump circuit coupled to the antenna and adapted to extract power from signals received from the antenna and to output a supply voltage; and a switch coupled to the charge pump circuit and the antenna and adapted to connect a portion of the charge pump circuit to the antenna in a manner to modulate an impedance of the antenna while a remaining portion of the charge pump circuit continues to supply voltage to the voltage supply output.

In accordance with another aspect of the foregoing embodiment, the charge pump includes series connected charge pump stages and the switch is coupled to an output of one of the series connected charge pump stages that is not a last stage, the switch having a control terminal adapted to receive a control signal that is generated by a control circuit utilizing binary data stored in the device.

In accordance with another aspect of the foregoing embodiment, the antenna is a dipole antenna and the switch is coupled to one pole of the dipole antenna.

BRIEF DESCRIPTION OF THE SEVERAL VIEWS OF THE DRAWINGS

These and other advantages and features of the disclosure will be presented in greater detail in the following description of an example of an implementation of the method of the disclosure, given in relation with, but not limited to, the following figures.

DETAILED DESCRIPTION

Figure 2:
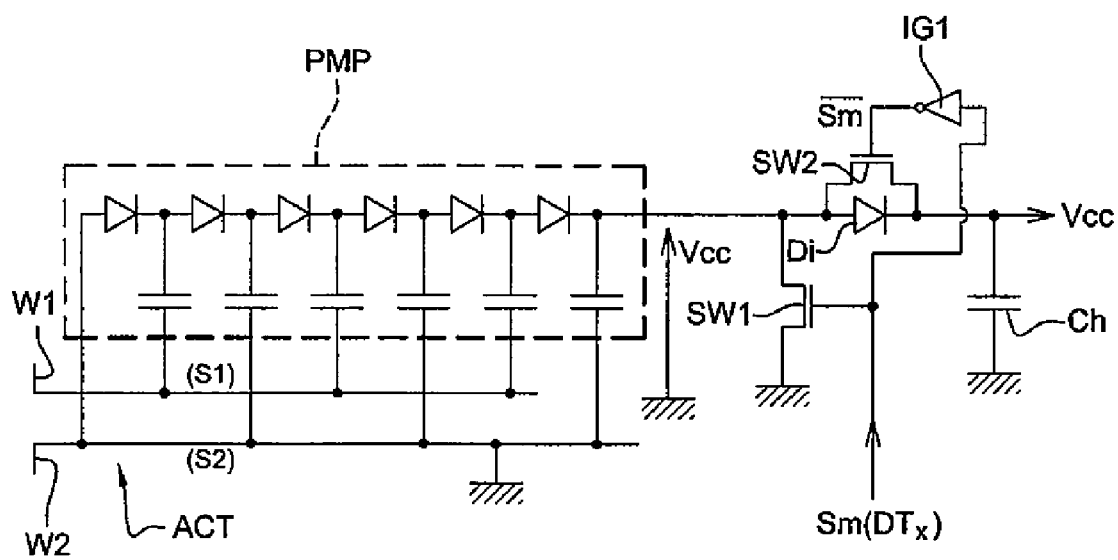
FIG. 2 shows a primary charge pump and standard means for modulating the impedance of the antenna circuit to which the charge pump is connected.

With reference to FIG. 2, the disclosure is based on the short-circuit aiming at modulating the impedance of the antenna circuit ACT, applied by the switch SW1 to the output of the charge pump PMP, that is the output of the last stage of the charge pump, which can be applied to another stage of the charge pump while obtaining an equivalent effect and at the very least sufficient as far as the modulation of the reflection coefficient of the antenna circuit is concerned.

Another aspect on which the disclosure is based is that, if this short-circuit is applied to a stage of the charge pump other than its last stage, the stages located downstream of the short-circuit region go on operating. Thus, the output of the charge pump goes on supplying the continuous voltage Vcc, although it is attenuated by the absence of stages located upstream the short-circuit region.

Thus, the disclosure provides the application of the impedance modulation short-circuit to the output of a stage of the charge pump other than the last stage, and preferably to the output of the first stage of the charge pump so that the number of stages downstream the short-circuit region is maximal and that the attenuation of the voltage Vcc is minimal.

Figure 3:
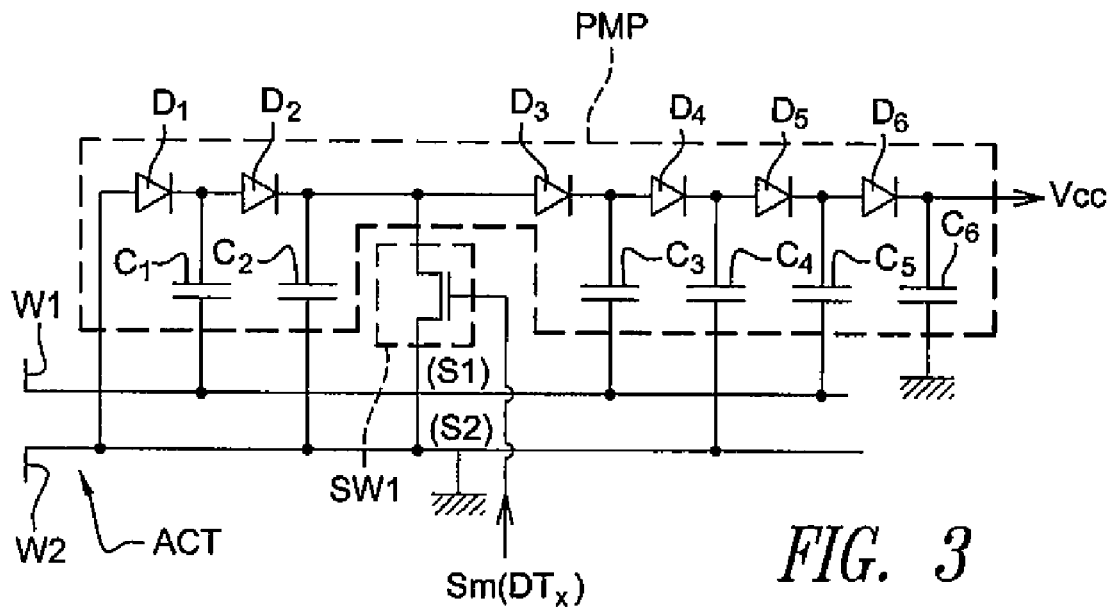
FIG. 3 shows a primary charge pump and means according to the disclosure for modulating the impedance of the antenna circuit to which the charge pump is connected.

FIG. 3 shows the application of the disclosure to the charge pump PMP already shown in FIG. 2, which structure is going to be described in further detail.

The charge pump PMP includes three pump stages in series. The first stage includes an input diode D1, an input capacitor C1, an output diode D2 and an output capacitor C2. The second stage includes an input diode D3, an input capacitor C3, an output diode D4 and an output capacitor C4. The third and last stage includes an input diode D5, an input capacitor C5, an output diode D6 and an output capacitor C6.

In each stage, the cathode of the input diode D1, D3, D5, is connected to a first terminal of the input capacitor C1, C3, C5 and to the anode of the output diode D2, D4, D6, which cathode is connected to a first terminal of the output capacitor C2, C4, C6. The second terminal of the input capacitor C1, C3, C5 is linked to the antenna conductor W1 and receives the first antenna signal S1. The second terminal of the output capacitor C2, C4, C6 is linked to the antenna conductor W2 and receives the second antenna signal S2.

The three stages of the charge pump are arranged in cascade, the cathode of the diode D2 connected to the anode of the diode D3 and the cathode of the diode D4 connected to the anode of the diode D6. At the input of the charge pump, the anode of the diode D1 is connected to the conductor W2. At the output of the charge pump, the capacitor C6 supplies the voltage Vcc. For the voltage Vcc not to be floating, the conductor W2 is linked to the ground of the integrated circuit.

At each half-cycle of the signals S1, S2, the second terminal of each capacitor Ci of even rank is brought to an electrical potential V(S2) higher than the potential V(S1) received by the second terminal of the capacitor of following uneven rank Ci+1, so that the capacitor Ci transfers electric charges into the following capacitor Ci+1, through the corresponding link diode Di, whereas the diode Di−1 of previous rank is blocked. At each following half-cycle, the second terminal of each capacitor Ci−1 of uneven rank is brought to an electrical potential V(S1) higher than the potential V(S2) received by the second terminal of the capacitor of following even rank Ci, so that the capacitor Ci−1 transfers electric charges into the capacitor Ci, through the corresponding link diode Di−1, whereas the diode Di−2 of previous rank is blocked.

Thus, if Vs is the difference of voltage in root-mean-square value between the antenna signals S1, S2 and Vd the threshold voltage of the diodes, the gain in voltage of each stage of the charge pump is equal to 2Vs-2Vd that is for example 0.6 Volt if Vs is equal to 0.5 Volt and Vd equal to 0.2 Volt. By adding the gains in voltage of the three stages, the last stage then supplies a voltage of 1.8 Volt.

In accordance with the method of the disclosure, the switch SW1 is arranged at the output of the first stage of the charge pump, that is in parallel with the capacitor C2.

The switch SW1 is for example a transistor NMOS with a drain terminal D connected to the first terminal of the capacitor C2 (cathode of the diode D2) and a source terminal S connected to the conductor W1 of the antenna circuit ACT, that is the ground of the integrated circuit. The gate of the transistor NMOS receives the modulation signal Sm(DTx).

When the signal Sm(DTx) is 0, the switch SW1 is OFF and the respective gains in voltage of the three stages of the charge pump cumulate to supply the voltage Vcc. When the signal Sm(DTx) is 1 (Vcc), the switch SW1 is ON and the output of the first stage of the charge pump is short-circuited. The short-circuit also has the effect of linking the input of the second stage of the charge pump (anode of the diode D3) to the conductor W1. The input of the second stage therefore receives the signal S1. The second stage of the charge pump then operates as a first stage of the charge pump. In other words, the charge pump operates as a charge pump with two stages instead of three.

Figure 4:
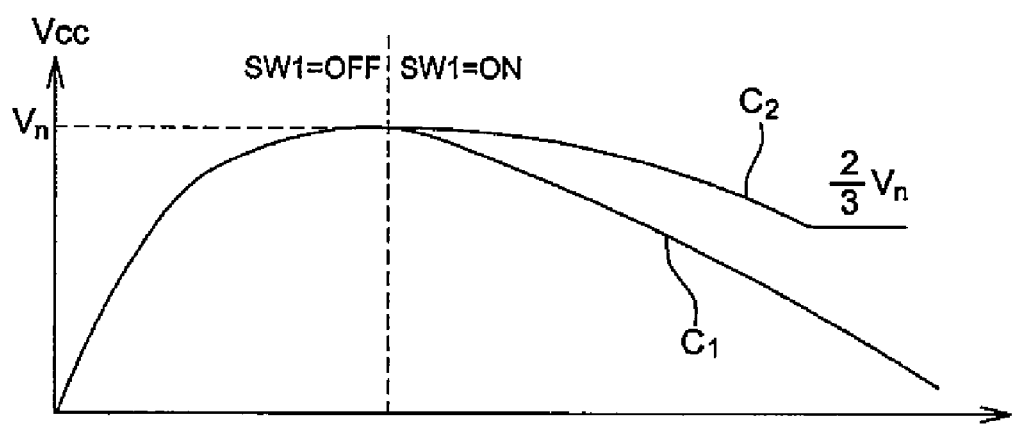
FIG. 4 shows the aspect of a voltage supplied by the charge pump of FIG. 2 and of a voltage supplied by the charge pump of FIG. 3 when a permanent short-circuit is applied to each charge pump.

FIG. 4 shows the profile of the voltage Vcc when the charge pump is permanently short-circuited by the switch SW1. The curve C1 illustrates the variations of the voltage Vcc in the configuration shown in FIG. 2, when the switch SW1 is arranged according to the prior art. The curve C2 illustrates the variations of the voltage Vcc in the configuration shown in FIG. 3, when the switch SW1 is arranged according to the disclosure. When the switch SW1 is open (SW1=OFF), the voltage Vcc reaches in both cases a plateau equal to the nominal supply voltage Vn of the integrated circuit. After the switch SW1 is closed (SW1=ON), the voltage Vcc according to the prior art (curve C1) decreases and tends towards zero as the capacitor Ch looses the electric charges it has accumulated. The voltage Vcc according to the disclosure (curve C2), here supplied by the capacitor C6, decreases less rapidly thanks to the pumping ensured by the second and third stages of the charge pump, then tends to a value different from zero which is equal to ⅔ of the nominal voltage Vn (theoretical value not taking into account the antenna circuit mismatching). This theoretical value would be of ¾ of the nominal voltage if the charge pump included four stages, of ⅘ of the nominal voltage if the charge pump included five stages.

A permanent short-circuit as shown in FIG. 4 however, does not correspond to the normal use of the modulation switch SW1, the signal Sm(DTx) being in practice a pulsed signal conveying data having alternations of short duration between the active state 1 and the default state 0.

Figures 5A, 5B:
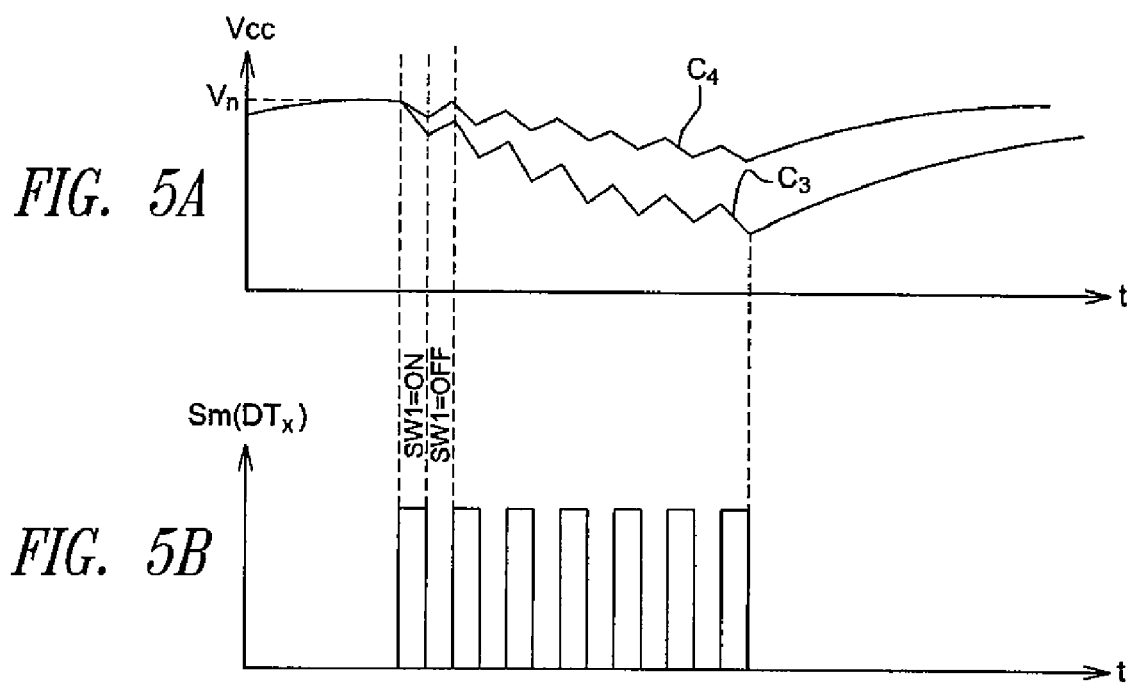
FIGS. 5A-5B show the aspect of a voltage supplied by the charge pump of FIG. 2 and of a voltage supplied by the charge pump of FIG. 3, respectively, when an intermittent short-circuit is applied to each charge pump.

FIG. 5A shows the profile of the voltage Vcc when the signal Sm(DTx) is a pulsed signal as shown in FIG. 5B. Curve C3 illustrates the variations of the voltage Vcc in the configuration shown in FIG. 2, when the switch SW1 is arranged according to the prior design. Curve C4 illustrates the variations of the voltage Vcc in the configuration shown in FIG. 3, when the switch SW1 is arranged according to the disclosure. In both cases, the voltage Vcc decreases each time the signal Sm(DTx) is at 1 and substantially increases each time the signal Sm(DTx) is at 0, so that the curves C3, C4 have a profile in "zigzag". However, the voltage Vcc according to the disclosure (curve C4) decreases less at each pulse to 1 of the signal Sm(DTx) and increases more rapidly each time the signal Sm(DTx) goes back to 0. Thus, the average value of the voltage Vcc according to the disclosure decreases less rapidly than the average value of the voltage Vcc according to the prior art.

Figure 1:
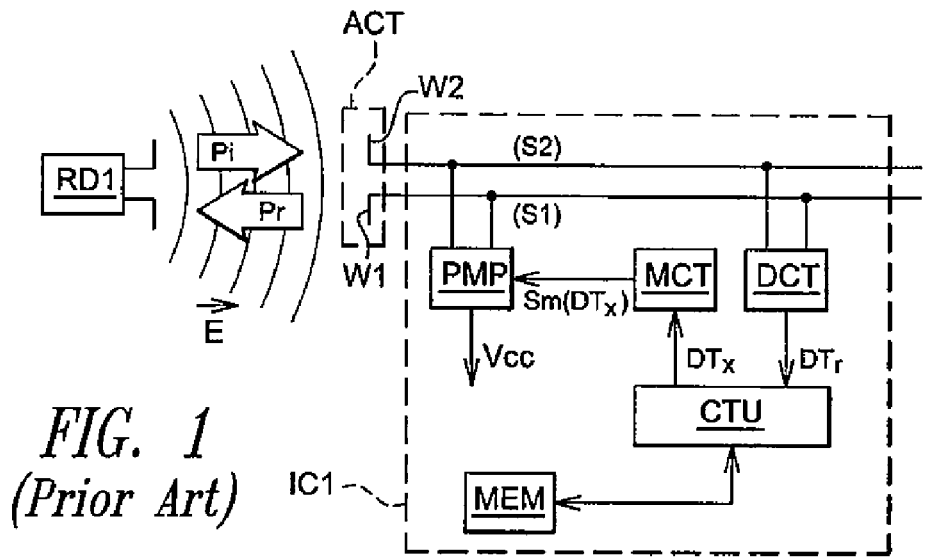
FIG. 1 schematically shows the structure of a contactless integrated circuit.

The disclosure applies to any type of contactless integrated circuit having a primary charge pump supplying a continuous voltage from antenna signals, like the integrated circuit IC1 of FIG. 1. The detailed architecture of this integrated circuit, known from those skilled in the art, will not be described in detail here. In particular, the integrated circuit IC1 can be designed in accordance with the industrial specifications EPCTM-GEN2 ("Radio-Frequency Identity Protocols Class-1 Generation-2-UHF RFID Protocol for Communications at 860 MHz-960 MHz") in the course of standardization.

The embodiments of the present disclosure offer various advantages, in particular a longer distance of communication between the integrated circuit IC1 and the reader RD1, and the suppression of the capacitor Ch, the diode Di and the switch SW2. Also, the periods of impedance modulation (changes of the signal Sm(DTx) to 1) can be of longer duration for a better reception of the data DTx by the reader RD1.

During a communication between the integrated circuit IC1 and the reader RD1, the reader RD1 sends data DTr to the integrated circuit IC1 by modulating an electric field E, for example an amplitude modulation. This amplitude modulation affects the antenna signals S1, S2 which are demodulated by the circuit DCT to extract the data received DTr, which are then supplied to the control unit CTU.

The unit CTU controls various elements present in the integrated circuit, supervises the communications and the execution of possible security protocols (for ex. passwords checking), as well as the execution of commands sent by the reader RD1 (in the form of data DTr), in particular commands for reading or writing in the memory MEM. The control unit also sends responses to commands, via the modulation circuit MCT, in the form of data DTx.

The integrated circuit IC1 can include a secondary charge pump, not shown in FIG. 1, in order to supply a voltage for erasing and programming the memory MEM. This secondary charge pump is electrically powered by the voltage Vcc supplied by the primary charge pump and supplies a boosted voltage.

According to the objectives regarding the impedance modulation of the antenna circuit, in particular the reflection coefficient desired, the short-circuit applied to the charge pump can be "total" or "partial". The short-circuit is "total" if the switch SW1 has a very low serial resistor, and is "partial" if the switch has a non negligible serial resistor (for example the drain-source resistance Rdson of a MOS transistor in the conducting state). A partial short-circuit can also be obtained by adding in series with the switch, any resistive, capacitive or inductive element necessary to obtain the desired value of the impedance of the antenna circuit during the modulation periods. Thus, in the present application, the term "short-circuit" means the fact of linking two points through a link which can include a simple or complex impedance of low or high value.

Although the disclosure is intended for contactless integrated circuits of the passive type, the disclosure is also applicable to integrated circuits equipped with an autonomous power supply. In that case, the voltage Vcc supplied by the charge pump is used as auxiliary supply voltage, for example in the event of a dysfunction of the autonomous power supply, or for powering some parts of the integrated circuit, or for recharging the autonomous power supply.

An integrated circuit according to the disclosure makes it possible to manufacture any type of portable electronic device having a portable support onto which the integrated circuit is fixed or into which it is integrated.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit for modulating the impedance of an antenna while maintaining a supply of voltage from signals received on the antenna, the circuit comprising:
    a charge pump coupled to the antenna, the charge pump comprising a plurality of charge pump stages adapted to supply power extracted from the received signals on the antenna, each charge pump stage having an input coupled to the antenna and an output coupled to a succeeding charge pump stage, with the output of the last charge pump stage coupled to a voltage supply output; and
    a switch element coupled between the antenna and the output of one of the charge pump stages that is not the last charge pump stage to couple and uncouple the output of the one of the charge pump stages that is not the last stage to the antenna in response to a control signal while the succeeding charge pump stage or stages continue supplying voltage on the voltage supply output.

2. The circuit of claim 1, in which the antenna is a dipole antenna, and wherein the switch element is coupled to a pole of the dipole antenna.

3. The circuit of claim 1, comprising a control circuit adapted to generate the control signal as a binary signal to open and close the switch element in response to data stored in the circuit.

4. A method, comprising:
    generating a control signal; and
    applying the control signal to a switch to periodically couple and uncouple at least one charge pump stage that is not a last charge pump stage of the charge pump to an antenna while allowing succeeding charge pump stages to continue supplying voltage to the voltage supply output to modulate the impedance of an antenna while maintaining a supply of power from signals received on the antenna.

5. The method of claim 4 wherein generating the control signal comprises generating a binary signal to open and close the switch in response to binary data read from a memory.

6. The method of claim 4 wherein coupling and uncoupling the at least one charge pump stage with respect to the antenna comprises coupling and uncoupling the at least one charge pump stage to one pole of a dipole antenna.

7. A device, comprising:
a charge pump circuit coupled to an antenna, the charge pump circuit having series-connected charge pump stages adapted to extract power from signals received from the antenna and to output a supply voltage to a voltage supply output terminal; and
a switch coupled to the charge pump circuit and the antenna and adapted to connect a portion of the charge pump circuit to the antenna to modulate an impedance of the antenna while a remaining portion of the charge pump circuit continues to supply voltage to the voltage supply output terminal, the switch coupled to an output of one of the series connected charge pump stages that is not a last stage, the switch having a control terminal adapted to receive a control signal that is generated by a control circuit utilizing binary data stored in the device.

8. The device of claim 7 wherein the antenna comprises a dipole antenna, and wherein the switch is coupled to a first pole of the dipole antenna.

9. The device of claim 8, wherein the switch element comprises a transistor having a first conducting terminal coupled to a second pole of the dipole antenna, a second conducting terminal coupled to an output of the one of the series of connected charge pump stages, and the control terminal coupled to the control circuit.

10. The device of claim 9, wherein each charge pump stage comprises a pair of series-coupled first and second diodes coupled at a common node, a first capacitor having a first terminal coupled to the first pole of the antenna and a second terminal coupled to the common node, a second capacitor having a first terminal coupled to the second pole of the antenna and a second terminal coupled to an output of the charge pump stage, the first diode having an anode coupled to the second pole of the dipole antenna, and the second diode having a cathode coupled to the second pole of the dipole antenna.

11. The device of claim 9, wherein the charge pump circuit comprises at least one intermediary pump stage between a first and a last pump stage, and wherein the switch is applied to an output of the first pump stage in order to allow the intermediary pump stage to continue supplying voltage.

12. The device of claim 11, wherein the switch is coupled to the second capacitor of a first pump stage of the charge pump circuit.

13. The device of claim 9, wherein each pump stage includes an input diode and an input capacitor, an output diode an output capacitor, a cathode of the input diode connected to an anode of the output diode and to a first terminal of the input capacitor, a second terminal of which is coupled to the first pole of the dipole antenna, a cathode of the output diode connected to a first terminal of the output capacitor, a second terminal of which is coupled to a second pole of the dipole antenna.

14. The device of claim 13, wherein the switch is structured to have a low intrinsic serial resistance and no additional serial impedance.

15. A system, comprising:
a memory;
a charge pump coupled to an antenna that is structured to receive signals, the charge pump including a plurality of charge pump stages structured to supply power extracted from the received signals on the antenna, each charge pump stage having an input coupled to the antenna and an output coupled to a succeeding charge pump stage, with the output of the last charge pump stage coupled to a voltage supply output;
a switch element coupled between the antenna and the output of one of the charge pump stages that is not the last charge pump stage to couple and uncouple the output of the one of the charge pump stages that is not the last stage to the antenna in response to a control signal while the succeeding charge pump stage or stages continue supplying voltage on the voltage supply output;
a control circuit coupled to the memory and to the switch element and structured to generate the control signal as a binary signal to open and close the switch element in response to data stored in the memory.

16. The system of claim 15, wherein the antenna is a dipole antenna, and wherein the switch element is coupled to a pole of the dipole antenna.

17. The system of claim 15, wherein the switch element is a modulation switch having a low intrinsic serial resistance and no additional serial impedance, the modulation switch structured to apply a short-circuit to the output of the first stage of the charge pump.

* * * * *